(12) United States Patent
Stapleton et al.

(10) Patent No.: US 6,827,244 B1
(45) Date of Patent: Dec. 7, 2004

(54) EXTENDABLE ARTICLE CARRIER

(75) Inventors: Craig A. Stapleton, St. Clair, MI (US);
Robert G. Cronce, Port Huron, MI
(US); Curt Nordin, Port Huron, MI
(US); Kevin D. Wilson, Lakeport, MI
(US); Terry L. Obermesik, Port Huron,
MI (US)

(73) Assignee: Sportrack LLC, Sterling Heights, MI (US)

( * ) Notice: Subject to any disclaimer, the term of this patent is extended or adjusted under 35 U.S.C. 154(b) by 135 days.

(21) Appl. No.: 10/337,639

(22) Filed: Jan. 7, 2003

(51) Int. Cl.[7] .............................................. B60R 9/042
(52) U.S. Cl. ...................................... 224/310; 224/321
(58) Field of Search ................................ 224/310, 321, 224/309, 315, 548, 549, 553, 504; 414/462, 477

(56) References Cited

U.S. PATENT DOCUMENTS

| | | |
|---|---|---|
| 3,963,136 A | 6/1976 | Spanke |
| 4,291,823 A | 9/1981 | Freeman et al. |
| 4,350,471 A | 9/1982 | Lehmann |
| 4,682,719 A | 7/1987 | Ernst et al. |
| 5,417,358 A | 5/1995 | Haselgrove |
| 5,535,929 A | 7/1996 | Neill |
| 5,632,591 A | 5/1997 | Henriquez |
| 5,649,655 A | 7/1997 | Kerner |
| 5,884,824 A | 3/1999 | Spring, Jr. |
| 5,988,470 A | 11/1999 | Siciliano |
| 6,015,074 A | 1/2000 | Snavely et al. |
| 6,105,840 A | 8/2000 | Trevino et al. |
| 6,308,874 B1 | 10/2001 | Kim et al. |
| 6,338,427 B1 | 1/2002 | Aftanas et al. |
| 6,427,888 B1 * | 8/2002 | Condon et al. .............. 224/310 |
| 6,431,421 B1 | 8/2002 | Albert |
| 6,516,984 B1 * | 2/2003 | Kmita et al. ................. 224/310 |
| 2003/0052145 A1 * | 3/2003 | Aftanas et al. ............. 224/310 |

FOREIGN PATENT DOCUMENTS

| | | |
|---|---|---|
| EP | 101054 A2 | 8/1983 |
| EP | 1077159 A2 | 2/2001 |
| EP | 1104718 A2 | 6/2001 |
| EP | 1124121 A2 | 9/2001 |
| EP | 1077159 A3 | 3/2002 |
| EP | 1104718 A3 | 3/2002 |
| EP | 1134121 A3 | 3/2002 |

OTHER PUBLICATIONS

Patent Abstract of Japan 2001012674.
US Patent Publication US2002/0215281, Pub. Date: Sep. 12, 2002.

* cited by examiner

Primary Examiner—Nathan J. Newhouse
(74) Attorney, Agent, or Firm—Rader, Fishman & Grauer PLLC

(57) ABSTRACT

An article carrier is described. The article carrier comprises a pair of side rails, an extendable article carrier, and at least one cross rail. The pair of side rails are affixed to a vehicle roof The extendable article carrier is adjustably positioned between the pair of side rails from a stowed position on a vehicle roof, to an extended position from the vehicle roof, and to a deployed position about a rear hatch. The extendable article carrier includes a first and a second pair of slider rail sections that are intermediately connected by a first pair of hinges, respectively. The extendable article carrier includes a third pair of slider rail sections. The second pair of slider rails and the third pair of slider rail sections are intermediately connected by a second pair of hinges. The first, second, and third pair of slider rail sections slide about a channel that is integrally formed in each of the side rails. The at least one cross rail is adjustably positioned between the first, second, and third pair of slider rail sections

22 Claims, 8 Drawing Sheets

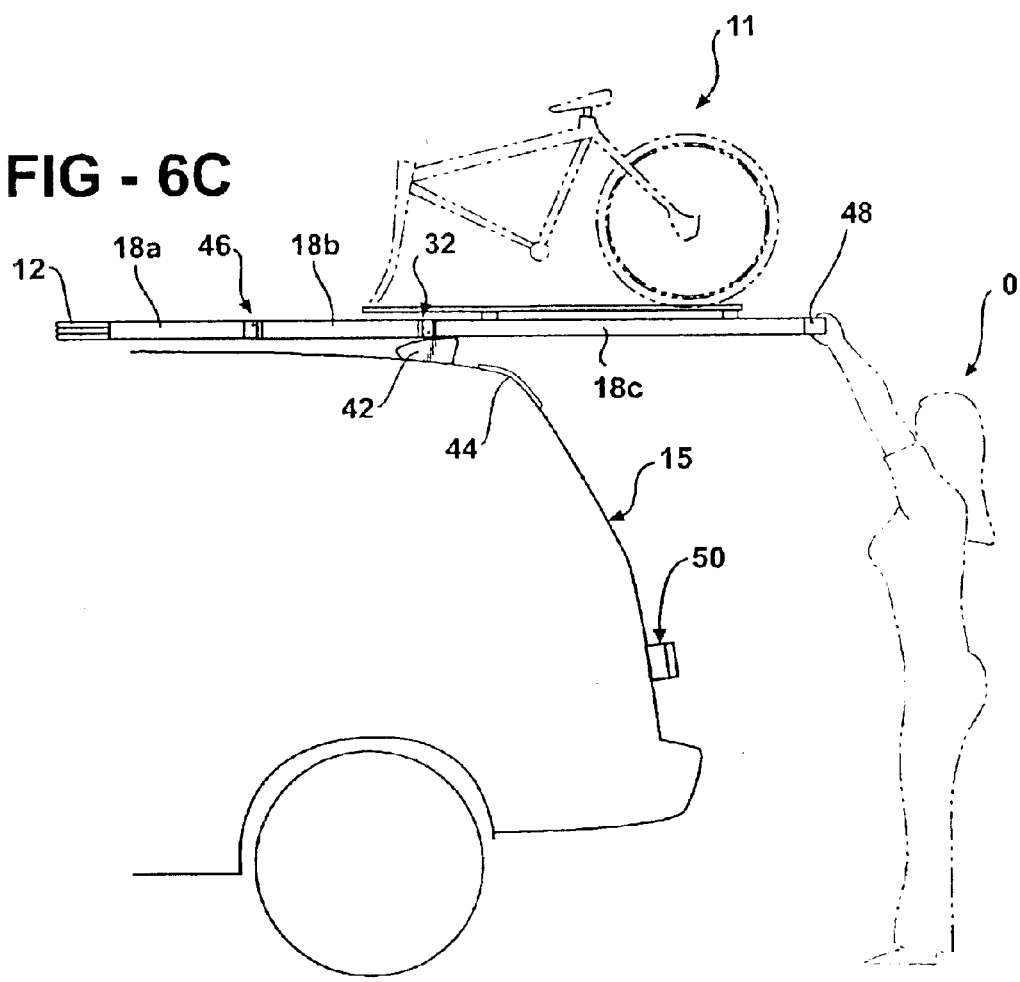

EXTENDABLE ARTICLE CARRIER

FIELD OF THE INVENTION

The present invention relates generally to an article carrier. More particularly, the present invention relates to an extend able article carrier that slides from a stowed position on a vehicle roof, to an extended position from the vehicle roof, and to a deployed position about a rear hatch of the vehicle.

BACKGROUND OF THE INVENTION

Article carriers are typically mounted on the roof of a vehicle, such as, for example, a mini-van or sport-utility-vehicle (SUV), and may carry a wide variety of articles such as luggage, cargo, bicycles, or the like. Although adequate for most situations, a person may be physically challenged when loading articles onto the carrier. In one example, a person may be relatively short in comparison to the vehicle and may require the use of a ladder to place the articles on the carrier. In another example, the articles may be heavy or cumbersome, making it difficult for a person to elevate the articles to the roof of the vehicle. As a result of the drawbacks associated with conventional article carriers, it is apparent that there is a need for a device that may assist a person in loading articles onto an article carrier.

SUMMARY OF THE INVENTION

In a first embodiment of the invention, a vehicle article carrier is described. The article carrier comprises a pair of side rails, an extendable article carrier, and at least one cross rail. The pair of side rails are affixed to a vehicle roof. The extendable article carrier is adjustably connected to the pair of side rails from a stowed position on the vehicle roof, to an extended position from the vehicle roof, and to a deployed position about a rear hatch of the vehicle. The extendable article carrier includes a first and a second pair of slider rail sections that are connected by a first pair of hinges, respectively. The extendable article carrier includes a third pair of slider rail sections. The second pair of slider rails and the third pair of slider rail sections are connected by a second pair of hinges. The first, second, and third pair of slider rail sections slide about a channel that is integrally formed in each of the side rails. The at least one cross rail includes at least one adjustable cross rail adjustably positioned between the first, second, and third pair of slider rail sections.

Another embodiment of the article carrier includes, at least one second cross rail adjustably positioned between the pair of side rails, an anchoring system including a first pair and second pair of locking elements that are located at a first end and a second end of the extendable article carrier, respectively, a pair of locking mechanisms, a guide member, and a rubber strip. The second pair of hinges include a rib-receiving cap and a ribbed cap pivotally coupled by a roll pin. The rib-receiving cap and the ribbed cap are respectively secured to the second pair of slider rails and the third pair of slider rail sections, respectively, by fasteners. The pair of locking mechanisms permits the extendable article carrier to be secured and locked to the hatch. The locking mechanisms each includes a base portion affixed to the hatch and a pivoting door affixed to the base portion. The pivoting door is affixed to the base portion by a spring-loaded detention ball. The pivoting door includes a keyed hole comprising a circular center section with a lateral slot that permits the second pair of locking elements to respectively lock the extendable article carrier to the locking mechanisms. The guide member is precisely located near the second end permitting the third pair of slider rail sections to physically contact the guide member. The guide member includes a curvilinear upper surface that restrict the second pair of hinges to pivotally break when the extendable article carrier is extended at a desirable distance away from the article carrier. The guide member resiliently deforms under pressure in order to bear the weight of the extendable article carrier and the article. The rubber strip is applied to the hatch by an adhesive in order to prevent third pair of slider rail sections from sliding on the hatch.

Various additional aspects and advantages of this invention will become apparent to those skilled in the art from the following detailed description of the preferred embodiment, when read in light of the accompanying drawings.

BRIEF DESCRIPTION OF THE DRAWING

FIG. 6C depicts a side view of the extendable article carrier according to FIG. 6B when the extendable article carrier is in a fully extended, loaded state prior to being transitioned in a stowed, loaded state;

DESCRIPTION OF THE PREFERRED EMBODIMENTS

Figure 1:
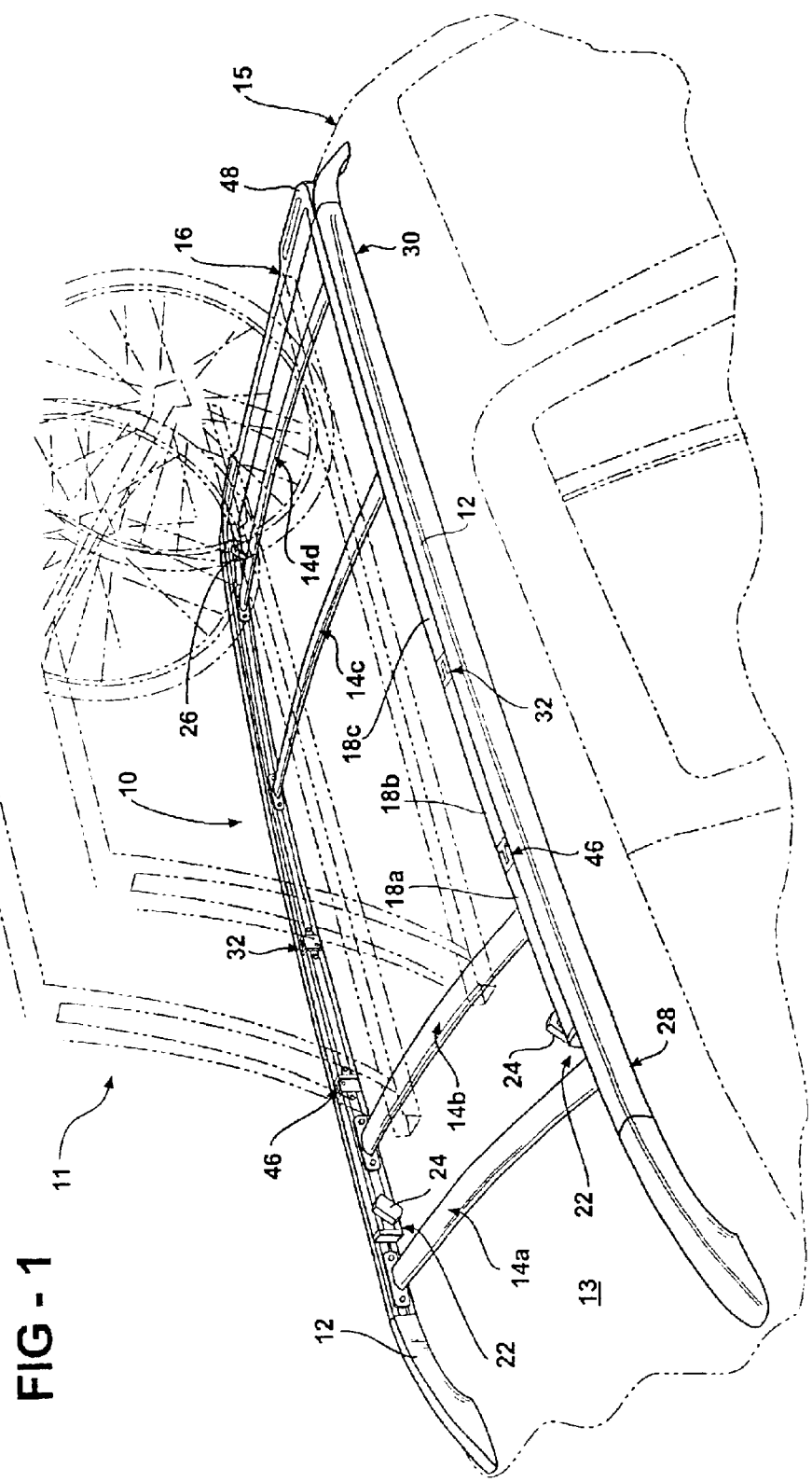
FIG. 1 depicts a perspective view of an extendable article carrier in a stowed position according to one embodiment of the invention.
Figure 2:
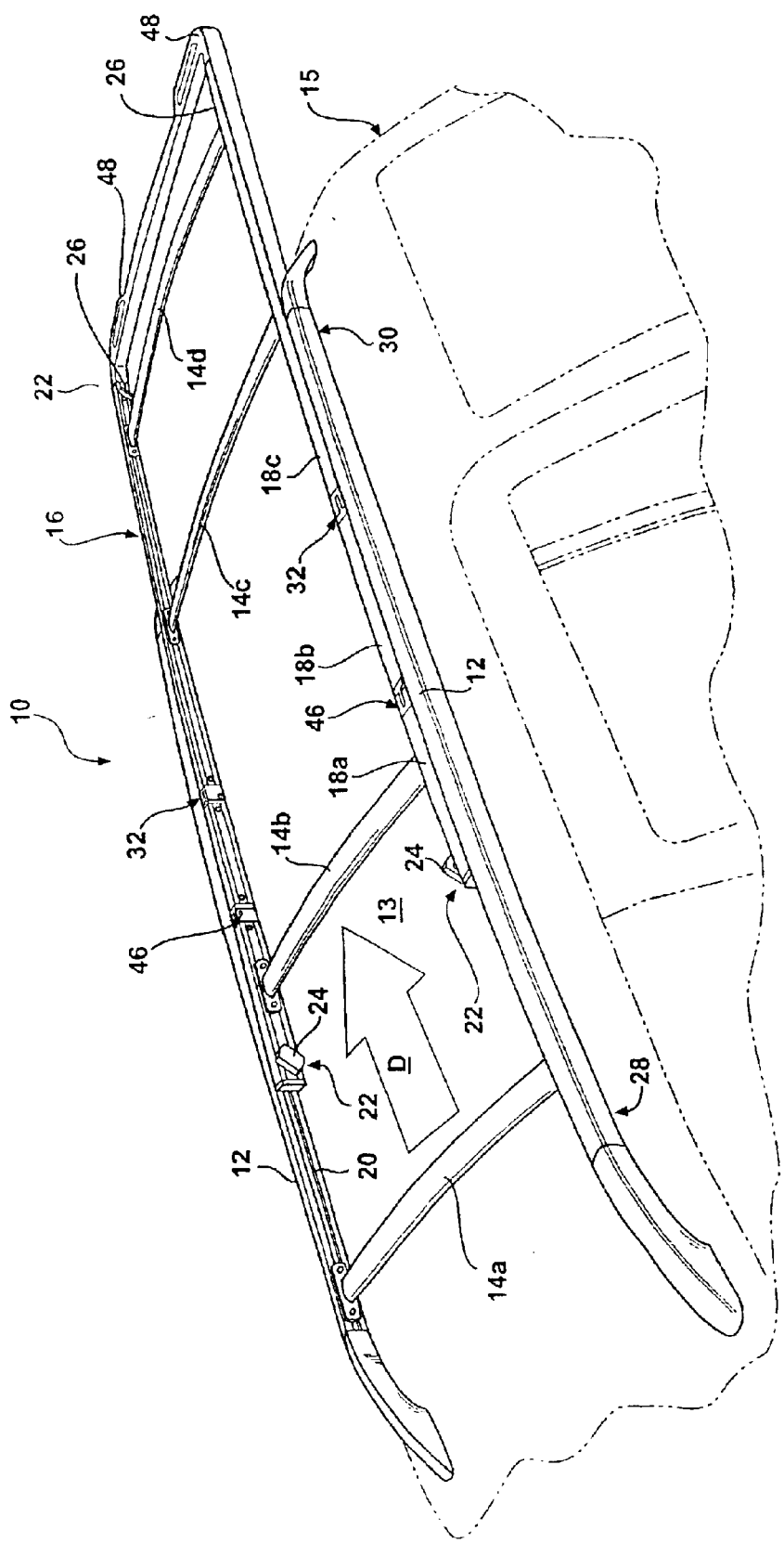
FIG. 2 depicts a perspective view of the extendable article carrier according to FIG. 1 in a partially extended position.

As illustrated in FIGS. 1 and 2, the present invention is directed to an article carrier, which is shown generally at 10, that comprises a pair of side rails 12, at least one cross rail, such as cross rails 14a–14d, and an extendable article carrier 16. The article carrier 10 and extendable article carrier 16 may comprise any desirable material, such as roll formed or extruded steel, that provides a platform for securing an article 11 (FIG. 1), such as luggage, cargo, bicycles, or the like. As illustrated, the cross rail 14a is adjustable between the side rails 12, and the cross rails 14b–14d are adjustable about the extendable article carrier 16. Although only four cross rails 14a–14d are shown, any desirable number of cross rails 14a–14d may be included in the design of the article carrier 10.

As seen more clearly in FIG. 2, the extendable article carrier 16 includes a pair of opposing insertion molded slider rails that are defined by slider rail sections 18a–18c that are connected by first and second hinges 32, 46. The slider rail sections 18a–18c slide about a channel, such as an inward facing channel 20, that is integrally formed in the side rails 12. The inward facing channel 20 and slider rail sections 18a–18c may have any desirable configuration that permits the slider rail sections 18a–18c to be matingly coupled about an outer surface of the side rails 12. In one example, the inward facing channel 20 may comprise a C- or H-channel, and each rail section 18a–18c may comprise a T-shaped rib that may frictionally engage and slide within the gap of the C- or H-channel; however, it is contemplated that the example illustrated above does not limit the invention to a C- or H-channel and a T-shaped rib, and that any desirable configuration may be employed that permits the slider rail sections 18a–18c to slide about the outer surface of the side rails 12.

Although, the channel 20 is illustrated to be an inward facing channel 20, the channel 20 may alternatively be an outward facing channel 20. If the channel 20 faces outward, the extendable article carrier would slide on an outboard facing portion of the side rails 12 as opposed to an inboard facing portion of the side rails as illustrated in FIG. 2. However, the outward facing channel 20 may not be aesthetically pleasing to the eye, and it may be desired to retain the channel 20 on the inboard side of the side rails 12 in order to maintain an aesthetically pleasing appearance of the article carrier 10.

As seen in FIGS. 1 and 2, prior to extenting the extendable article carrier 16, an anchoring system 22 including a first pair 24 and second pair 26 of locking elements, such as, for example, quarter-turn thumbwheels or spring-loaded push buttons, which are illustrated at a first end 28 and second end 30 of the extendable article carrier 16, respectively, are unlocked. Upon unlocking the locking elements 24, 26, the extendable article carrier 16 may be extended toward a hatch 15 in the direction as illustrated by the arrow, D (FIG. 2). Then, as seen in FIG. 3, the extendable article carrier 16 may be pivoted in the direction of the arrow, P, about a first pair of opposing hinges 32 so that the extendable article carrier 16 may be fully deployed against the rear door or hatch 15.

Figure 4:
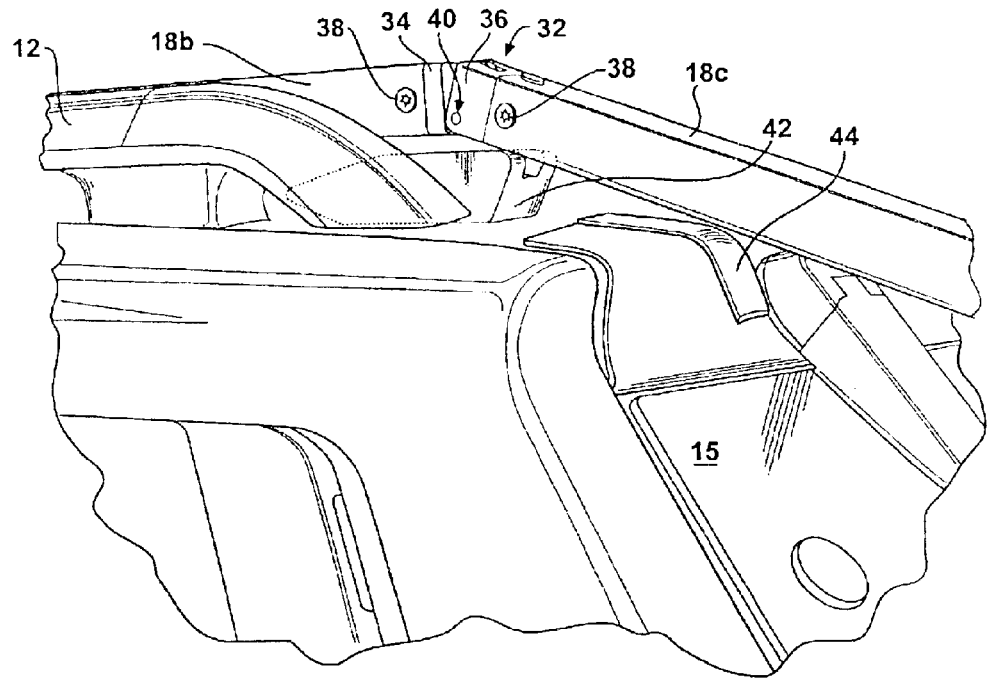
FIG. 4 depicts a perspective view of a hinge of the extendable article carrier according to FIG. 1 when the extendable article carrier is in a partially deployed position.
Figure 5:
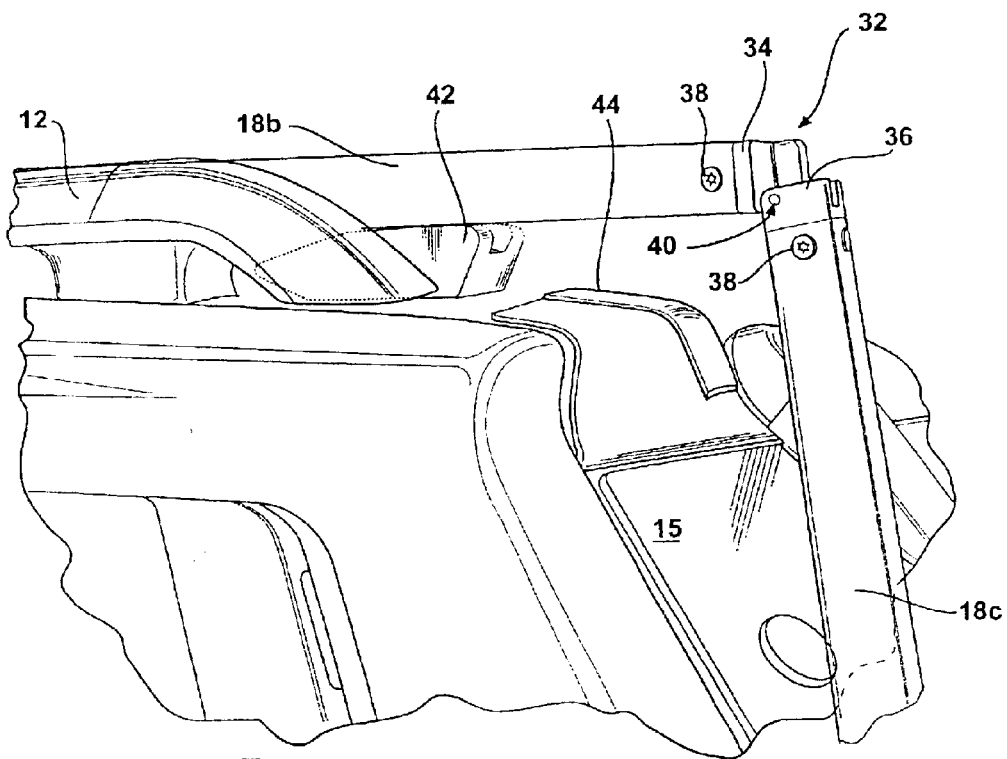
FIG. 5 depicts another perspective view of the hinge according to FIG. 4 when the extendable article carrier is in a deployed position.

As seen more clearly in FIGS. 4 and 5, one of the opposing hinges is illustrated in greater detail. Each opposing hinge 32 includes a rib-receiving cap 34 and a ribbed cap 36 that are secured to slider rail sections 18b and 18c, respectively. The caps 34, 36 may be secured to the slider rail sections 18b, 18c with any desirable fastener, such as screws 38, bolts, or the like. Each cap 34, 36, that defines the hinge 32 may be pivotally joined by a roll pin 40. As seen more clearly in FIG. 1, the ribbed cap 36 may have any desirable shape, such as, for example, a T-shaped rib that that pivotally interacts with the rib-receiving cap 34. According to the illustrated embodiment in FIGS. 4 and 5, the caps 34, 36 restrict pivotal movement about the hinge 32 from 0 degrees to approximately 45 degrees; however, if desired, the hinge 32 may be designed to accommodate any desirable pivoting movement greater than 45 degrees.

In an effort to relieve stresses from the roll pin 40, the article carrier may further comprise a guide member 42. As seen more clearly in FIG. 4, the guide member 42 may be precisely located near the second end 30 of the article carrier 10 near to the hatch 15 so that the slider rail section 18c physically contacts the guide member 42. The guide member 42 is defined to include a curvilinear upper surface that may restrict the hinge 32 to pivotally break when the extendable article carrier 16 is extended at a desirable distance away from the side rails 12. The guide member 42 may comprise any desirable material that resiliently deforms under pressure, such as, for example, plastic or rubber, in order to bear the weight of the extendable article carrier 16 and/or the article 11 when in a loading or an unloading position. The article carrier 10 may also comprise a rubber strip 44 applied to the hatch 15 with any desirable adhesive so that the slider rail section 18c does not slide on and physically contact the hatch 15, resulting in damage thereabouts, such as dents or paint chipping or streaking.

Figure 3:
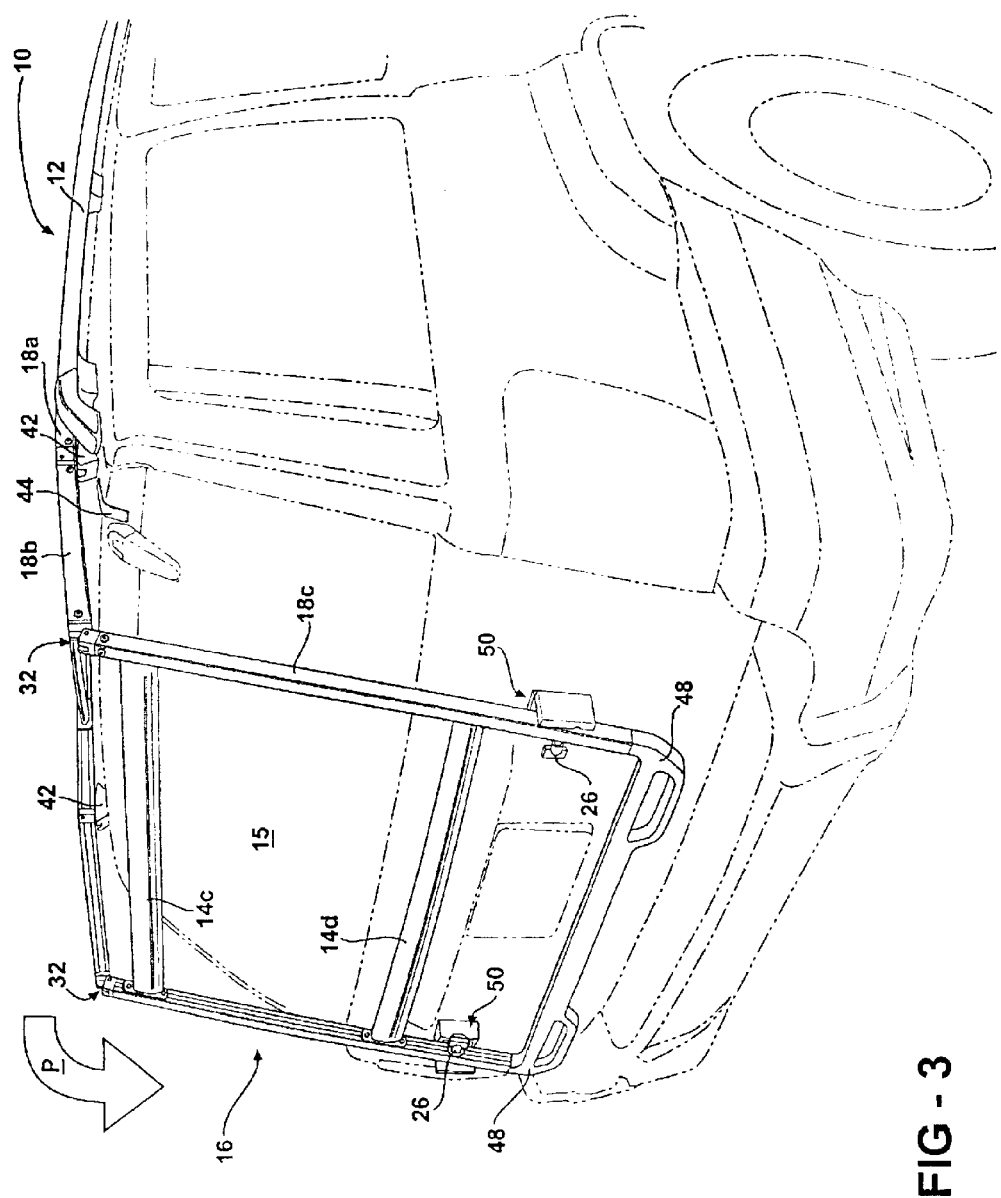
FIG. 3 depicts a perspective view of the extendable article carrier according to FIG. 1 in a deployed position.
Figure 6A:
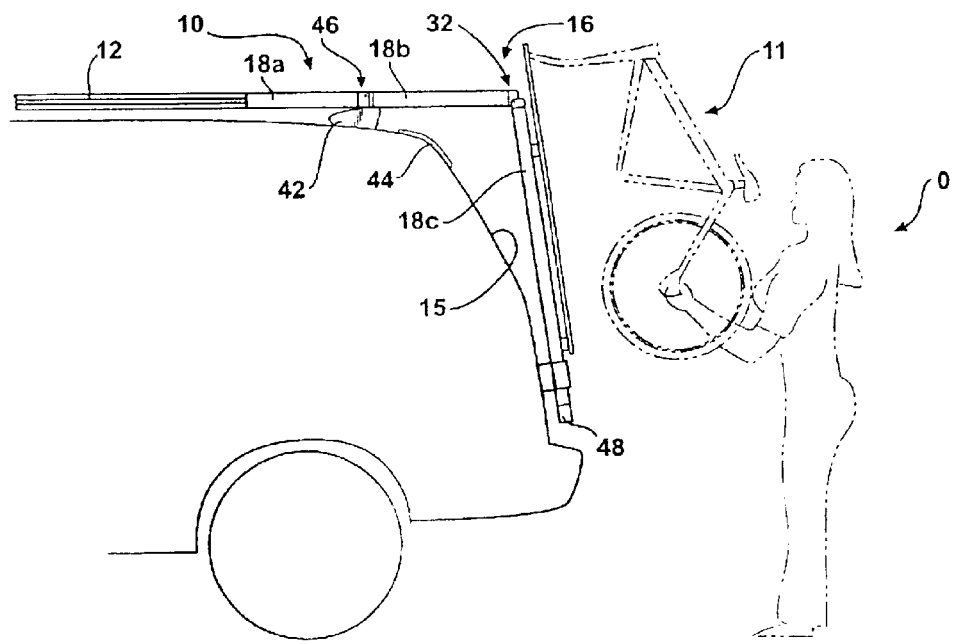
FIG. 6A depicts a side view of the extendable article carrier according to FIG. 1 when the extendable article carrier is in a deployed, unloaded state.
Figure 6B:
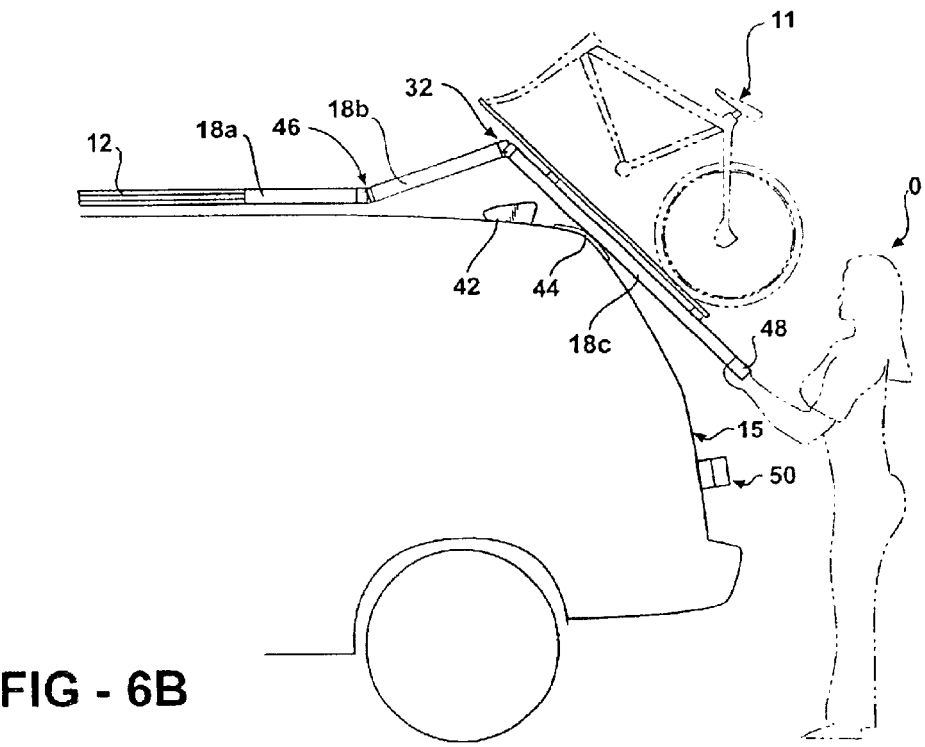
FIG. 6B depicts a side view of the extendable article carrier according to FIG. 6A when the extendable article carrier is in a partially deployed, loaded state.

In operation, the extendable article carrier 16 slides from a fully stowed position on a vehicle roof 13 (FIG. 1) to an extended position from the vehicle roof 13 (FIG. 2) and to a fully deployed position about a hatch 15 (FIGS. 3). In a first situation, as seen in FIG. 6A, once the extendable article carrier 16 is fully deployed about the hatch 15, an operator, O, may load an article 11, such as a bicycle, to the extendable article carrier 16. Then, as seen in FIG. 6B, the operator, O, may grasp a handle 48, and push the extendable article carrier 16 to the stowed position on the roof 13. As illustrated, the extendable article carrier 16 may flexibly pivot at the first pair of opposing hinges 32 and the second pair of opposing hinges 46 in order to prevent the binding, snapping, and damage to the extendable article carrier 16 and side rails 12. Then, as seen in FIG. 6C, the operator, O, may push the extendable article carrier 16 to the stowed position about the roof 13.

Figure 7:
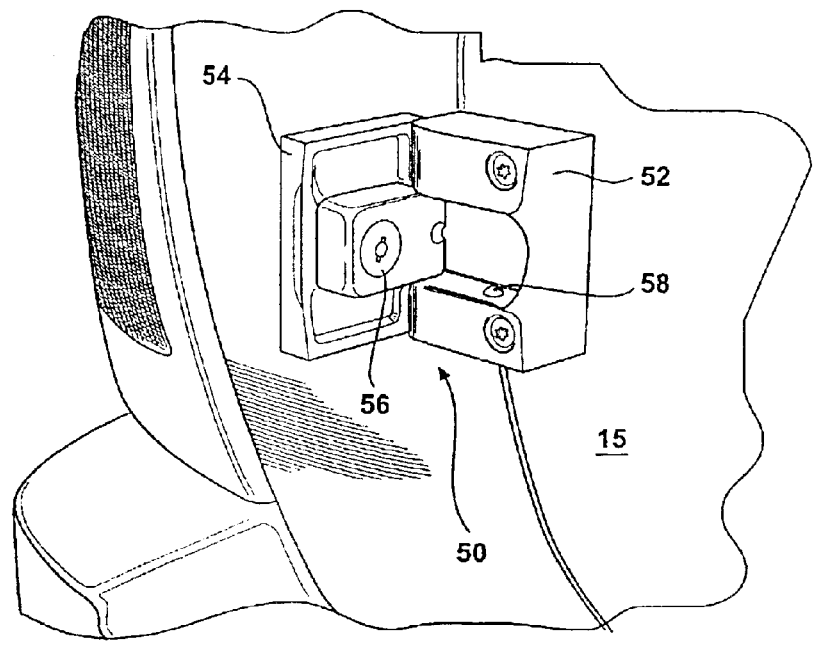
FIG. 7 depicts a perspective view of a locking mechanism affixed to the hatch.
Figure 8:
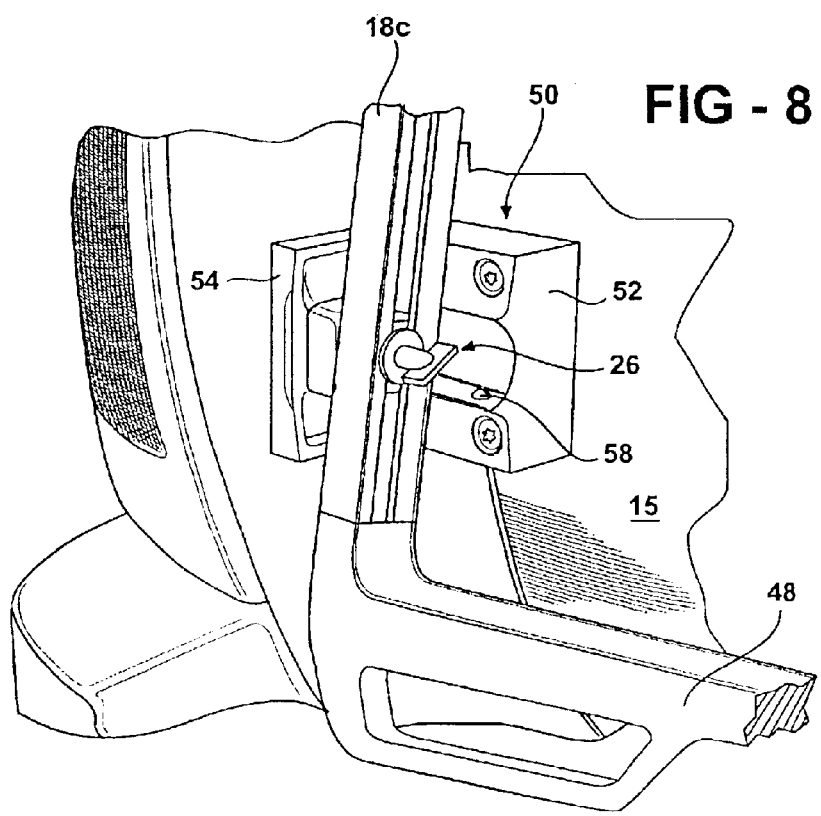
FIG. 8 depicts another perspective view of the locking mechanism according to FIG. 7 coupled to the extendable article carrier.

As seen in FIGS. 7 and 8, in another situation, the operator, O, may wish to secure articles 11, to the article carrier 10 when the extendable article carrier 16 is deployed about the hatch 15. Accordingly, the extendable article carrier 16 may be secured and locked to the hatch 15 by a locking mechanism 50. According to the illustrated embodiment, the locking mechanism 50 may comprise a base portion 52 affixed to the hatch 15 and a pivoting door 54 affixed to the base portion 52. When the pivoting door 54 is pivoted to an in-use position for locking the extendable article carrier 16 to the locking mechanism 50, a keyed hole 56 is exposed on an inner surface of the pivoting door 54. Each keyed hole 56 comprises a circular center section with a lateral slot that permit reception of the second locking element 26. When the second locking element 26 is positioned in and turned about the lateral slot, the second locking element 26 is locked in place about the keyed hole 56.

Figure 9:
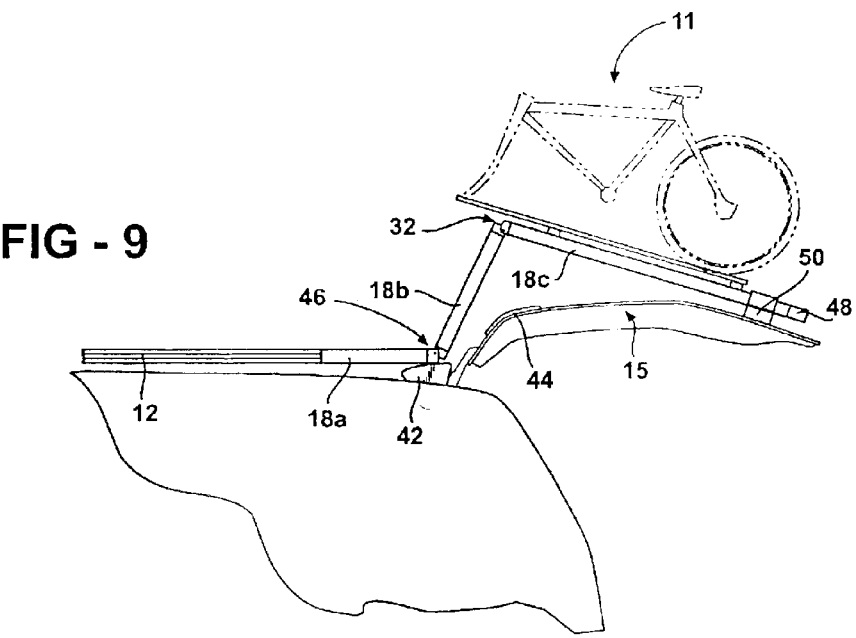
FIG. 9 depicts another side view of the extendable article carrier according to FIG. 1 illustrating another loaded state when the hatch is in an open position.

As illustrated in FIG. 9, the operator, O, may desirably open the hatch 15 while the extendable article carrier 16 is secured thereto. In this situation, the hatch 15, which may be deployed by gas shocks, bears the weight of the extendable article carrier 16 and the article 11 when the extendable article carrier 16 is locked to the hatch 15. Because the hatch 15 has a different pivoting axis than the extendable article carrier 16 (i.e. a different pivoting axis than that of the first pair of opposing hinges 32), the second pair of opposing hinge points 46 permits the hatch 15 to be opened so that binding, snapping, and damage to the extendable article carrier 16 and side rails 12 is prevented. According to the illustrated embodiment in FIGS. 6B and 9, the second pair of opposing hinge points 46 may pivot from 0 degrees to approximately 45 degrees; however, if desired, the hinge 46 may be designed to accommodate any desirable pivoting movement of the hinge 46 that is greater than 45 degrees.

Figure 10:
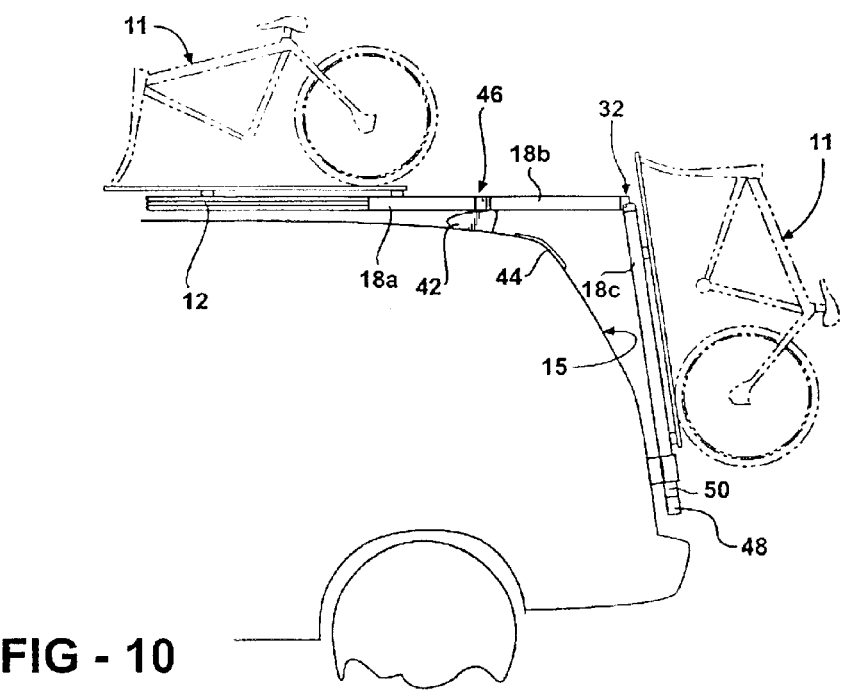
FIG. 10 depicts another side view of the extendable article carrier according to FIG. 1 illustrating another loaded state when articles are loaded about the hatch and roof of the vehicle.

As seen in FIG. 10, the operator, O, may also desirably store additional articles 11 about the roof 13 while articles 11 are stored about the extendable article carrier 16 on the hatch 15. Accordingly, additional cross rails, such as cross rail 14a as seen in FIG. 2, may be loosened and adjustably slid rearward on the article carrier 10 so that the additional articles 11 may be secured on the roof 13. In this illustrated example, the extendable article carrier 16 and hatch 15 may be deployed open as described above in a similar fashion as illustrated in FIG. 9.

Referring back to FIGS. 7 and 8, when the operator, 0, does not wish to lock the extendable article carrier 16 about the hatch 15, the pivoting door 54 of the locking mechanism 50 may be left in the closed position. In the closed position, the pivoting door 54 may be employed as a bumper when the operator, O, as seen in FIG. 6A, deploys the extendable article carrier 16 about the hatch 15. When the pivoting door 54 is used as a bumper, the pivoting door 54 may be secured to the base portion 52 with any desirable snap-type, spring loaded device, such as a spring-loaded detention ball 58.

Essentially, the inventive article carrier 10 may assist a person in loading articles 11 onto an article carrier 10. Accordingly, a person that is relatively short in comparison to the vehicle may load articles 11 to the extendable article carrier 16 when it is in the deployed position about the hatch 15, thus, obviating the use of a ladder or similar device to step up to the roof of the vehicle. Even further, articles 11 that are heavy or cumbersome may be easily loaded to the extendable article carrier 16 when it is in the deployed position about the hatch 15. Yet even further, when articles 11 are stowed about the extendable article carrier 16 in the deployed position about the hatch 15, the storing of articles 11 on the roof 13 is obviated, thereby reducing vehicular drag when the vehicle is being driven, and thus improves gas mileage of the vehicle.

The foregoing detailed description shows that the preferred embodiments of the present invention are well suited to fulfill the objects of the invention. It is recognized that those skilled in the art may make various modifications or additions to the preferred embodiments chosen here to illustrate the present invention, without departing from the spirit of the present invention. Accordingly, it is to be understood that the subject matter sought to be afforded protection hereby, should be deemed to extent to the subject matter defined in the appended claims, including all fair equivalence thereof.

What is claimed is:

1. A vehicle article carrier, comprising:
   a pair of side rails affixed to a vehicle roof;
   an extendable article carrier adjustably connected to the pair of side rails, wherein the extendable article carrier includes a first and second pair of slider rail sections are connected by a first pair of hinges, wherein the extendable article carrier further includes a third pair of slider rail sections, wherein the second pair of slider rails and the third pair of slider rail sections are connected by a second pair of hinges, wherein the first, second, and third pair of slider rail sections slide about a channel that is integrally formed in each of the side rails permitting the extendable article carrier to be adjustably positioned between the pair of side rails from a stowed position on the vehicle roof, extended away to a deployed position about a rear hatch of said vehicle; and
   at least one first cross rail, wherein the at least one cross-rail includes at least one adjustable cross rail adjustably positioned between the first, second, or third pair of slider rail sections.

2. The article carrier of claim 1 further comprising at least one second cross rail adjustably positioned between the pair of side rails.

3. The article carrier of claim 1, wherein the first and second pair of hinges are each pivotable from 0 degrees to approximately 45 or more degrees.

4. The article carrier of claim 1 further comprising a guide member precisely located near the second end permitting the third pair of slider rail sections to physically contact the guide member, the guide member includes a curvilinear upper surface that restrict the second pair of hinges to pivotally break when the extendable article carrier is extended at a desirable distance away from the article carrier, the guide member resiliently deforms under pressure in order to bear the weight of the extendable article carrier and the article.

5. The article carrier of claim 1 further comprising a rubber strip applied to the hatch by an adhesive in order to prevent third pair of slider rail sections from sliding on the hatch.

6. The article carrier of claim 1 further comprising a handle located at an end of the extendable article carrier.

7. The article carrier of claim 1, wherein the channel is a C-channel, and each first, second, and third pair of slider rail sections includes a T-shaped rib that frictionally engages and slides within the C-channel.

8. The article carrier of claim 1, wherein the article carrier and the extendable article carrier comprises roll formed or extruded steel.

9. The article carrier of claim 1, wherein the second pair of hinges include a rib-receiving cap and a ribbed cap pivotally coupled by a roll pin, the rib-receiving cap and the ribbed cap are respectively secured to the second pair of slider rails and the third pair of slider rail sections, respectively, by fasteners.

10. The article carrier of claim 9, wherein the ribbed cap includes a T-shaped rib.

11. The article carrier of claim 1 further comprising an anchoring system including a first pair and second pair of locking elements that are located at a first end and a second end of the extendable article carrier, respectively.

12. The article carrier of claim 11, wherein the first and second pair of locking elements are quarter-turn thumbwheels.

13. The article carrier of claim 11, wherein the first and second pair of locking elements are spring-loaded push buttons.

14. The article carrier of claim 11 further comprising a pair of locking mechanisms that permits the extendable article carrier to be secured and locked to the hatch, the locking mechanisms each includes a base portion affixed to the hatch and a pivoting door affixed to the base portion, wherein the pivoting door is affixed to the base portion by a spring-loaded detention ball, the pivoting door includes a keyed hole comprising a circular center section with a lateral slot that permits the second pair of locking elements to respectively lock the extendable article carrier to the locking mechanisms.

15. A vehicle article carrier, comprising:
   a pair of side rails affixed to a vehicle roof;
   an extendable article carrier adjustably connected to the pair of side rails, wherein the extendable article carrier includes a first and second pair of slider rail sections are connected by a first pair of hinges, wherein the extendable article carrier further includes a third pair of slider rail sections, wherein the second pair of slider rails and the third pair of slider rail sections are connected by a second pair of hinges, wherein the second pair of hinges include a rib-receiving cap and a ribbed cap pivotally coupled by a roll pin, the rib-receiving cap and the ribbed cap are respectively secured to the second pair of slider rails and the third pair of slider rail sections, respectively, by fasteners, wherein the first, second, and third pair of slider rail sections slide about a channel that is integrally formed in each of the side rails permitting the extendable article carrier to be adjustably positioned between the pair of side rails from a stowed position on the vehicle roof, extended away to a deployed position about a rear hatch of said vehicle;

at least one first cross rail, wherein the at least one cross-rail includes at least one adjustable cross rail adjustably positioned between the first, second, or third pair of slider rail sections;

at least one second cross rail adjustably positioned between the pair of side rails;

an anchoring system including a first pair and second pair of locking elements that are located at a first end and a second end of the extendable article carrier, respectively;

a pair of locking mechanisms that permits the extendable article carrier to be secured and locked to the hatch, the locking mechanisms each includes a base portion affixed to the hatch and a pivoting door affixed to the base portion, wherein the pivoting door is affixed to the base portion by a spring-loaded detention ball, the pivoting door includes a keyed hole comprising a circular center section with a lateral slot that permits the second pair of locking elements to respectively lock the extendable article carrier to the locking mechanisms;

a guide member precisely located near the second end permitting the third pair of slider rail sections to physically contact the guide member, the guide member includes a curvilinear upper surface that restrict the second pair of hinges to pivotally break when the extendable article carrier is extended at a desirable distance away from the article carrier, the guide member resiliently deforms under pressure in order to bear the weight of the extendable article carrier and the article; and a rubber strip applied to the hatch by an adhesive in order to prevent third pair of slider rail sections from sliding on the hatch.

16. The article carrier of claim 15, wherein the first and second pair of locking elements are quarter-turn thumbwheels.

17. The article carrier of claim 15, wherein the first and second pair of locking elements are spring-loaded push buttons.

18. The article carrier of claim 15, wherein the ribbed cap includes a T-shaped rib.

19. The article carrier of claim 15, wherein the first and second pair of hinges are each pivotable from 0 degrees to approximately 45 or more degrees.

20. The article carrier of claim 15 further comprising a handle located at an end of the extendable article carrier.

21. The article carrier of claim 15, wherein the channel is a C-channel, and each first, second, and third pair rail sections includes a T-shaped rib that frictionally engages and slides within the C-channel.

22. The carrier of claim 15, wherein the article carrier and the extendable article carrier comprises roll or extruded steel.

* * * * *